(12) United States Patent
Adam et al.

(10) Patent No.: US 6,382,714 B1
(45) Date of Patent: May 7, 2002

(54) ROOF ARRANGEMENT

(75) Inventors: Wolfgang Adam, Nagold; Volker Richters, Leinfelden-Echterdingen, both of (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 09/373,989

(22) Filed: Aug. 16, 1999

(30) Foreign Application Priority Data

Aug. 14, 1998 (DE) .......................... 198 36 849

(51) Int. Cl.⁷ ............................................. B60J 7/047
(52) U.S. Cl. ................... 296/223; 296/220.01; 296/224
(58) Field of Search ............... 296/220.01, 223, 296/224

(56) References Cited

U.S. PATENT DOCUMENTS

| | | | |
|---|---|---|---|
| 4,363,515 A | 12/1982 | Lutz er al. .................. | 296/222 |
| 5,167,296 A | 12/1992 | Schreier et al. ......... | 296/223 X |
| 5,421,635 A * | 6/1995 | Reinsch et al. ......... | 296/220.01 |
| 5,765,907 A | 6/1998 | Nabuurs ............ | 296/220.01 X |
| 6,053,568 A | 4/2000 | Jambor .............. | 296/220.01 X |

FOREIGN PATENT DOCUMENTS

| | | | |
|---|---|---|---|
| DE | 917 594 | 9/1954 | |
| DE | 2940565 | 4/1981 | |
| DE | 3737725 | * 12/1988 | ............ 296/220.01 |
| DE | 44 15 649 C1 | 6/1995 | |
| DE | 197 56 020 | 12/1997 | |
| EP | 309775 | * 4/1989 | ............ 296/220.01 |
| EP | 0 794 077 | 9/1997 | |
| GB | 2113623 | * 8/1983 | ............ 296/220.01 |
| GB | 2 225 704 | 6/1990 | |
| GB | 2 228 663 | 9/1990 | |
| GB | 2 258 848 | 2/1993 | |
| JP | 56-67624 | 6/1981 | |

* cited by examiner

*Primary Examiner*—Dennis H. Pedder
(74) *Attorney, Agent, or Firm*—Crowell & Moring LLP

(57) ABSTRACT

A roof arrangement for a roof aperture of a motor vehicle having at least two roof sections which are mounted in a common guide to be movable in the longitudinal direction of the vehicle. At least the foremost roof section relative to the direction of travel of the motor vehicle is assigned means for blocking this roof section in the guide, the blocking taking place as a function of a deceleration of the motor vehicle caused by a vehicle impact.

11 Claims, 3 Drawing Sheets

ROOF ARRANGEMENT

BACKGROUND AND SUMMARY OF THE INVENTION

The invention relates to a roof arrangement for a roof aperture of a motor vehicle, the roof arrangement having at least two roof sections which are mounted in at least one guide so as to be movable in the longitudinal direction of the vehicle.

This application claims the priority of 198 36 849.6, filed Aug. 14, 1998, the disclosures of which is expressly incorporated by reference herein.

German patent document DE 44 15 649 C1 discloses a slatted roof for a car. The slatted roof has a plurality of slatted roof sections mounted via a push-out and guide mechanism in a roof aperture of the car and is displaceable in the longitudinal direction of the vehicle. A guide member is, assigned to each slatted roof section, and is a supporting slide arranged in a guide rail. Each supporting slide has a locking member which can be actuated by an adjacent slatted roof section. The locking member engages into a recess on the guide rail side when the associated support slide has reached a particular end position.

Patent document DE-PS 917 594 discloses a telescopic canopy top for a motor vehicle wherein a plurality of roof hoops are displaceably arranged in a guide in the longitudinal direction of the vehicle. The foremost roof hoop, in the direction of travel, can be locked by a latch device in the closed position of the canopy roof on the vehicle body.

The object of the present invention is to provide a roof arrangement of the above-mentioned type in which release of the roof sections from the roof aperture, in particular in the opened state, is prevented in the event of a serious vehicle collision.

This and other objects are achieved by the present invention in that at least the foremost roof section, relative to the direction of travel of the motor vehicle, is assigned means for locking this roof section in the guide. Locking takes place as a function of a deceleration of the vehicle caused by a vehicle impact. In the event of a vehicle collision, which is associated with abrupt deceleration of the vehicle, the foremost roof section and, with it the other roof sections, are retained in their original positions, as a result of which releasing of the roof sections from the guide is prevented. The guide is, of course, of sufficiently strong design so as not to be significantly distorted by the forces acting on the roof sections in the course of the deceleration of the vehicle as a result of impact.

In an embodiment of the invention, a retaining member fixedly arranged to the vehicle bodywork at least at one side, is provided as means for locking at least the foremost roof section. The retaining member may be fixed to the vehicle bodywork on one side, or alternatively on both sides, and preferably extends in the longitudinal direction of the vehicle. A second retaining member, fixedly arranged to the bodywork on one side, is preferably fixedly connected on the other side at least to the foremost roof section. A retaining member arranged fixed to the bodywork on both sides is conceivable as an additional guide arrangement for the roof sections and positioned parallel to the guide in the roof aperture.

In a further embodiment of the invention, a tensioning is means is fixedly arranged to the bodywork behind the foremost roof section, especially behind the roof aperture, relative to the direction of travel of the motor vehicle is provided as a retaining member. The tensioning means is preferably of flexible design so that it can follow the normal sliding movement of the roof sections connected thereto. In the event of a disproportionate deceleration, when the corresponding roof sections attempt to escape their intended position in the direction of travel as a result of mass inertia effects, it is subjected to tensile stress by the roof sections engaging on it.

In a further embodiment of the invention, a tensioning and/or compression means which acts as a retaining member is fixedly arranged to the bodywork in front of the foremost roof section, especially in front of the roof aperture, relative to the direction of travel of the motor vehicle. Suitable tensioning/compression means are guide members which extend beyond the roof aperture in the longitudinal direction of the vehicle and are substantially rigid, such as for example telescopic rod members.

In a further embodiment of the invention, at least one roof section is assigned a support slide, via which the roof section is mounted in the guide. A support slide permits precise and reliable positioning of a roof section connected thereto relative to the roof aperture.

In a further embodiment of the invention, a connecting member, such as an eyelet, is arranged on at least one roof section and/or at least one support slide and engages on the retaining member. The corresponding roof section and/or the corresponding support slide is thereby guided on the retaining member, so that it cannot escape upwardly from the guide. If a retaining member in the form of a flexible tensioning means is used, it is contemplated that the tensioning means will be fixed on both sides, on the one hand on the vehicle bodywork behind the roof aperture and on the other hand either on the foremost roof section or on the vehicle bodywork in front of the roof aperture. The roof sections and/or support slides located between the fixing points can be fixed in a particularly simple manner via such connecting members to be movable on such a retaining member.

In a further embodiment of the invention, the retaining member is designed as a flexurally slack tensioning means and can be wound up onto a rotatable drum fixed to the bodywork. The retaining member is, furthermore, preferably fixedly secured to the foremost roof section or to a support slide allocated to this roof section. Depending on the position of the foremost roof section, a more or less large length of the flexurally slack tensioning means is wound onto the drum to save space. The drum is preferably designed as part of an automatic roll-up device.

In a further embodiment of the invention, the drum is of a spring-loaded design such that the flexurally slack tensioning means can be wound up automatically, and the drum is assigned a braking device locking as a function of the centrifugal force or as a function of deceleration. In doing so, the braking device blocks the rotation of the drum, either in the event of an acceleration of the rotation of the drum attributable to a disproportionate deceleration of the vehicle or in the event of a deceleration of the vehicle directly sensed by means of a deceleration sensor. Drum and braking device thus form an automatic roll-up device in the manner of an automatically locking inertia reel for a passenger seat belt.

Further advantages and features of the invention are apparent from the subclaims and from the description which follows, in which a preferred example of embodiment of the invention is illustrated with reference to a drawing.

DETAILED DESCRIPTION OF THE DRAWINGS

Figure 1:
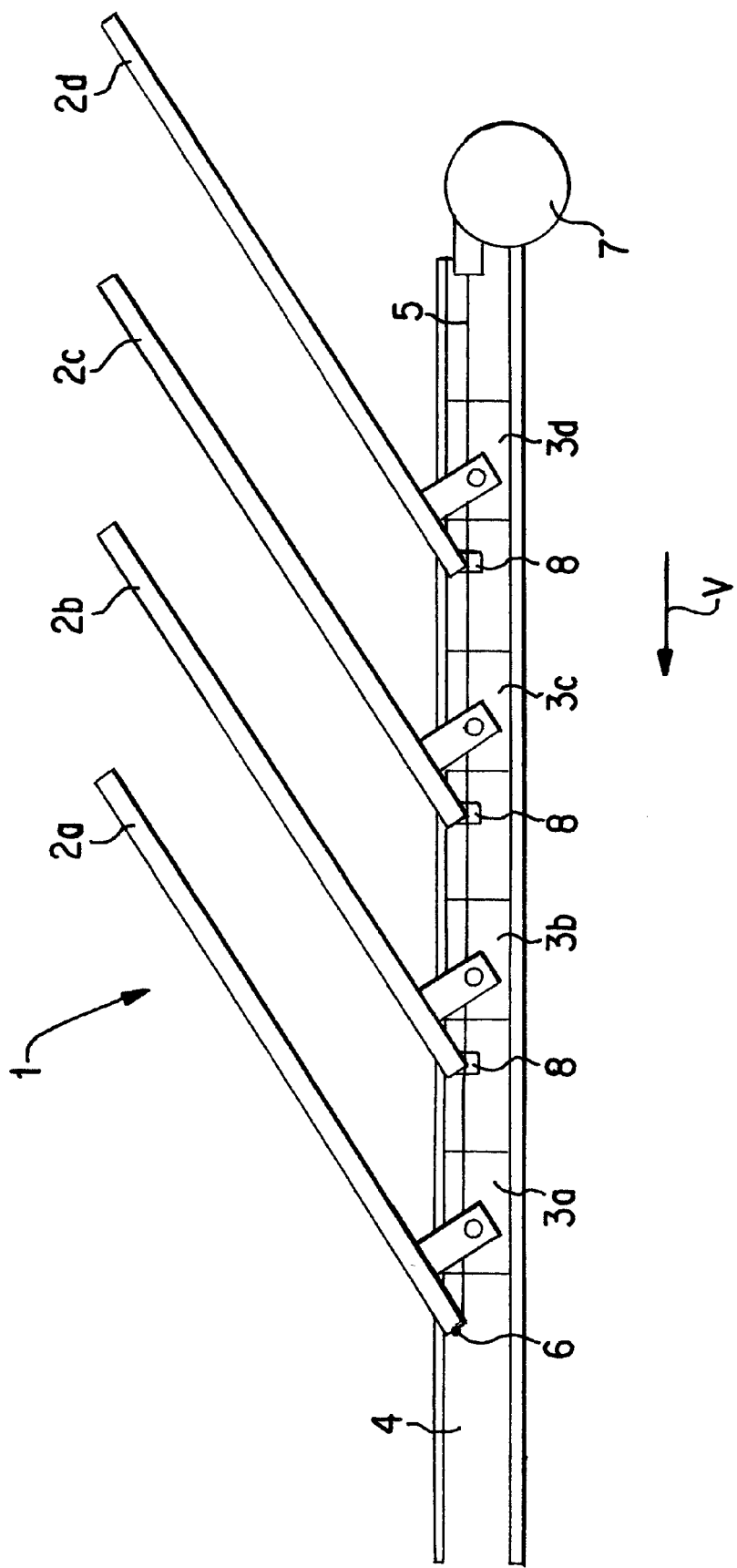
FIG. 1 shows a diagrammatic lateral view of an embodiment of a roof arrangement according to the invention in the form of a slatted roof.
Figure 2:
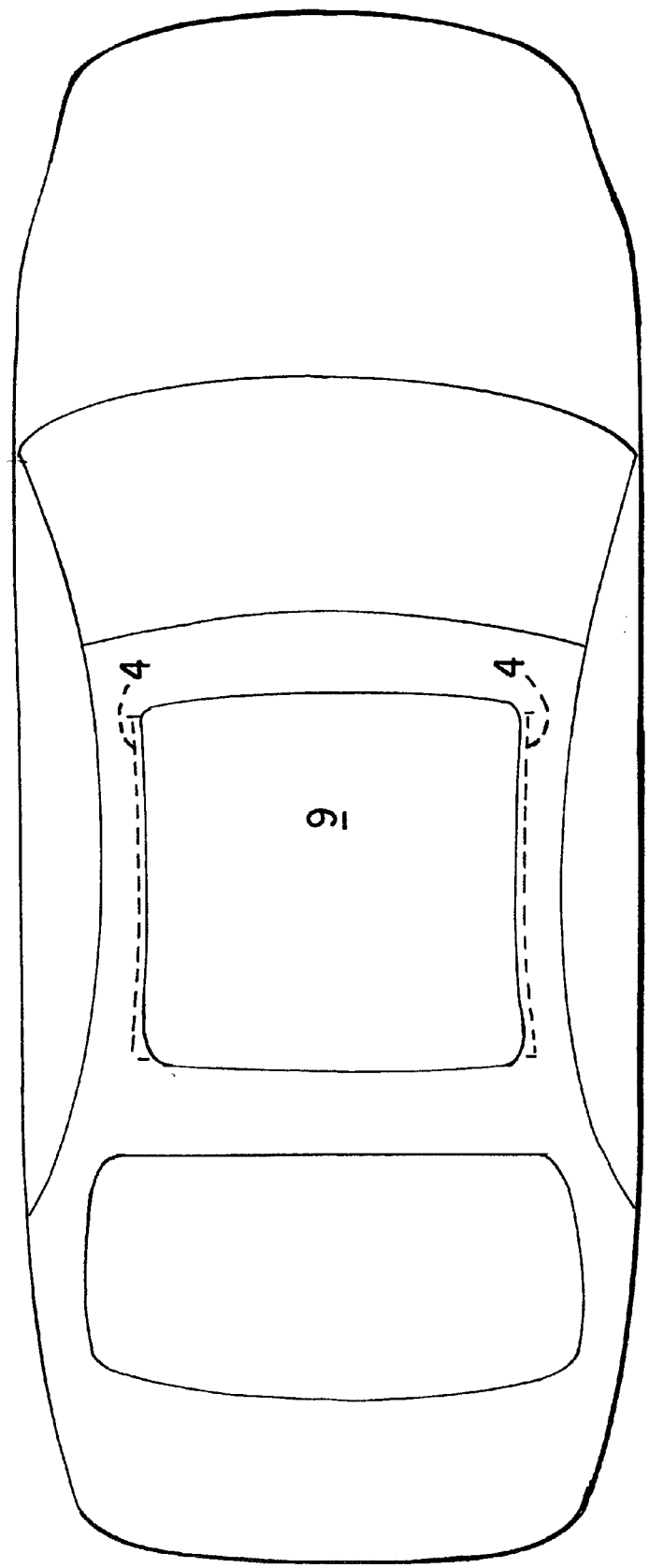
FIG. 2 shows top view of a vehicle having a roof aperture.

In FIG. 1, a roof arrangement for a roof aperture of is a motor vehicle in the form of a slatted roof 1 is shown, having four roof sections 2a to 2d. The roof sections are each mounted to be pivotably movable on support slides 3a to 3d. Support slides 3a–3d are arranged in a guide 4 to be movable in the longitudinal direction of the vehicle, in other words parallel to the direction of the arrow V. FIG. 1 shows the roof arrangement 1 in an opened position, wherein the roof sections 2a to 2d have been pushed fully back relative to the direction of travel V of the vehicle and are aligned obliquely upwards. The slatted roof 1 may be mounted on an individual guide 4 or on a plurality of guides 4 arranged parallel to each other in the transverse direction of the vehicle along the roof aperture 9, as shown in FIG. 2.

The foremost roof section 2a and/or the associated support slide 3a are connected in a conventional manner to a drive mechanism (not shown). Starting from the illustrated opened position, the roof sections 2a to 2d can be moved jointly with the support slide 3a to 3d via the drive mechanism in the direction of travel V of the motor vehicle into a closed position. When this occurs, the foremost roof section 2a is directly driven, while the other roof sections are entrained by the foremost roof section via a mechanical coupling (not shown). The guides are profiled so that an upward escape of the support slides is prevented. C-shaped guide profiles are particularly suitable for this.

According to the invention, a retaining member, such as a belt 5 is assigned to the roof sections 2. The belt 5 is designed as a flexurally slack tensioning means and extends between a fixing point 6 at a side of the foremost roof section 2a, relative to the direction of travel V of the motor vehicle, and a roll-up device 7 arranged on the vehicle behind the roof aperture.

The roll-up device 7 comprises, in a manner not shown in detail, a rotatable drum on which the belt 5 can be wound. For automatic winding, a corresponding spring is assigned to the drum which exerts a torque on the drum and causes automatic rotation of the drum. Furthermore, a pawl engaging as a function of centrifugal force is assigned to the drum as part of the roll-up device and serves as a braking device against disproportionately accelerated unwinding. The function of the roll-up device 7 thus corresponds to that of an inertia reel for a passenger seat belt.

The belt 5 is prestressed via the spring on the side of the roll-up device between the fixing point 6 and the drum of the roll-up device and is clasped between the two by a plurality of connecting members which are designed in the form of eyelets 8 fixedly connected to the other roof sections 2b to 2d.

Figure 4:
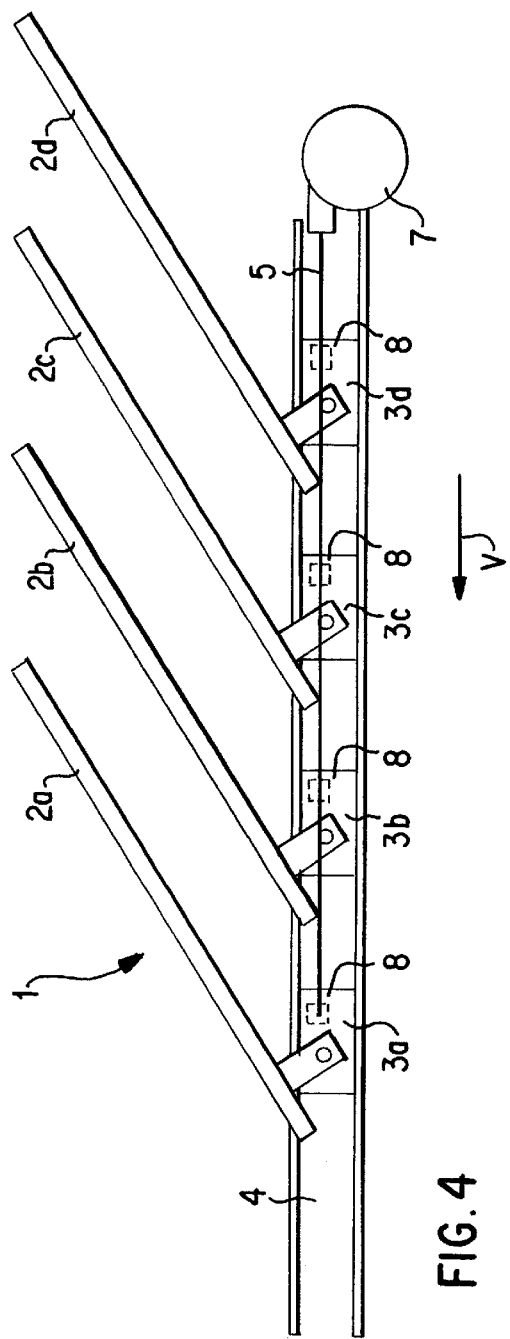
FIG. 4 shows a diagrammatic lateral view of an embodiment of a roof arrangement.

In a modified example of embodiment, as shown schematically in FIG. 4, connecting members 8 are arranged on the support slides 3a to 3d.

In the event of a movement of the foremost roof section 2a in the direction of the arrow V, the belt is slowly unwound from the wind-up device 7 against the spring force. In the event of a reverse movement, the spring member arranged within the roll-up device 7 ensures that the belt is automatically wound up onto the drum. When this occurs, the belt 5 is pulled by each of the eyelets 8.

In the event of a frontal vehicle collision, in which a sharp deceleration of the vehicle occurs as a function of the impact stress, high mass inertia forces arise which engage on the roof sections and the support slides. These mass inertia forces may, in the roof arrangements known from the prior art, have the effect that the roof sections and associated support slides are released from their positions. When this occurs, the destruction of the guide of the support slides and a continuing catapulting of the roof sections may also occur.

Such an event is prevented as follows by the arrangement according to the invention. The belt 5 is arranged, between the fixing point 6 on the foremost roof section 2a and the roll-up device 7, in a prestressed manner by the spring provided in the roll-up device 7. Such an arrangement obtains in any desired position of the roof sections 2a to 2d. If, as a result of vehicle impact stress, a disproportionate deceleration of the vehicle combined with an acceleration of the support slides 3 and of the roof sections 2a to 2b relative to the motor vehicle occurs, the pawl provided in the roll-up device 7 blocks a rapid unwinding of the belt 5. As a result, the foremost roof section 2a is held in its position, the belt 5 being heavily stressed. Via the connecting members 8 engaging on the heavily stressed belt 5, the roof sections 2b to 2d are restrained from escaping upwards from the guide 4. The support slides 3b to 3d of the rear roof sections 2b to 2d are preferably designed so that they directly adjoin the support slide 3a of the foremost roof section 2a and can be supported thereby in the direction of travel V.

In a further modified example of embodiment, a guide wire serving as a tensioning and/or compression means 10 is provided as a retaining member instead of the belt 5 and extends in the longitudinal direction of the vehicle over the roof aperture of the motor vehicle. The guide wire is arranged fixed to the vehicle at both ends, in other words in front of and behind the roof aperture, the roof sections 2a to 2d each being assigned identical connecting members 8.

Figure 3:
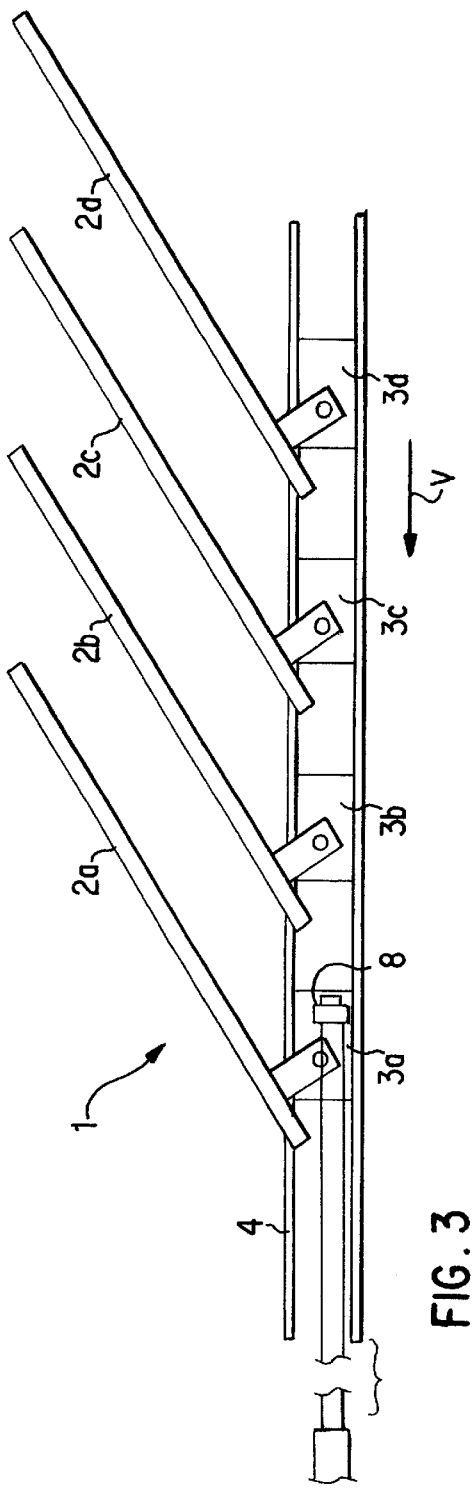
FIG. 3 shows a diagrammatic lateral view of an embodiment of a roof arrangement.

In a further modified example of embodiment, a telescopic guide rod, shown schematically in FIG. 3, serving as a compression means is provided as a retaining member instead of the belt 5. This is arranged fixed to the vehicle in front of the roof aperture and supports the foremost roof section 2a or the foremost support slide 3a at the front. A pawl controlled by mass inertia forces and serving as a braking device may be provided on the guide rod and, in the event of a sharp deceleration of the vehicle, engages automatically and prevents telescoping of the guide rod.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A roof arrangement for a roof aperture of a motor vehicle, comprising at least two roof sections moveably mounted in at least one guide so as to permit movement of the at least two roof sections in a longitudinal direction of the vehicle, wherein at least a foremost roof section relative to the direction of travel of the motor vehicle includes a blocking device at least at one lateral side of the aperture for preventing forward motion of the foremost roof section in the guide, in the event of a deceleration of the motor vehicle caused by a vehicle impact, the blocking device operatively engaging the at least two roof sections for preventing upward movement of said roof sections in the event of said deceleration.

2. A roof arrangement according to claim 1, the blocking device comprising a retaining member arranged on the motor vehicle bodywork at least at one lateral side of the opening, wherein the retaining member is adapted to prevent forward motion of at least the foremost roof section.

3. A roof arrangement according to claim 2, wherein the retaining member comprises a tensioner fixedly arranged on the bodywork behind the foremost roof section, relative to the direction of travel of the motor vehicle.

4. A roof arrangement for a roof aperture of a motor vehicle, comprising at least two roof sections moveably mounted in at least one guide so as to permit movement of the at least two roof sections in a longitudinal direction of the vehicle,
    wherein at least a foremost roof section relative to the direction of travel of the motor vehicle includes a blocking device at least at one lateral side of the aperture for preventing forward motion of the foremost roof section in the guide, in the event of a deceleration of the motor vehicle caused by a vehicle impact, the blocking device comprising a retaining member arranged on the motor vehicle bodywork at least at one lateral side of the opening, wherein the retaining member is adapted to prevent forward motion of at least the foremost roof section, and
    wherein the retaining member comprises a compression element arranged fixed to the bodywork in front of the foremost roof section relative to the direction of travel of the motor vehicle.

5. A roof arrangement according to claim 1, wherein the at least one roof section is connected with at least one support slide through which the roof section is mounted in the guide.

6. A roof arrangement according to claim 5, wherein the blocking device has a retaining member fixedly connected to a support slide assigned to the foremost roof section.

7. A roof arrangement according to claim 2, further comprising a connecting member, arranged on at least one roof section to engage the retaining member.

8. A roof arrangement according to claim 2, wherein the retaining member is designed as a flexurally slack tensioner and can be wound onto a roll-up device arranged fixedly to the bodywork.

9. A roof arrangement according to claim 8, the roll-up device is designed such that the flexurally slack tensioner can be wound up automatically and the roll-up device can be stopped as a function of centrifugal force or as a function of deceleration.

10. A roof arrangement for a roof aperture of a motor vehicle, comprising:
    at least two roof sections, each of said roof sections having an end slidably mounted in at least one guide thereby allowing said end to move in a longitudinal direction of the motor vehicle, and
    at least a foremost roof section includes a blocking device adapted to prevent forward motion of at least said foremost roof section in the at least one guide, said blocking device being arranged so as to prevent forward motion of the foremost roof section in place during deceleration of the motor vehicle caused by collision, the blocking device operatively engaging the at least two roof sections for preventing upward movement of said roof sections in the event of said deceleration.

11. A blocking device for a moveable roof of a motor vehicle, comprising:
    at least one guide positioned along a longitudinal direction of a roof aperture of the motor vehicle,
    a series of roof sections, each roof section having an end slidably mounted in the at least one guide, and
    a flexible retaining element having one end attached to at least a foremost roof section at at least one lateral side of the aperture, and another end fixedly attached to the motor vehicle, the flexible retaining element being positioned so as to prevent forward motion of the foremost roof section in place during a sudden deceleration of the motor vehicle, said flexible retaining element operatively engaging the roof sections for preventing upward movement of said roof sections in the event of said deceleration.

* * * * *